US005881911A

United States Patent [19]

Burdette et al.

[11] Patent Number: 5,881,911

[45] Date of Patent: Mar. 16, 1999

[54] VENDING MACHINE

[75] Inventors: Crystal Gaye Burdette; Eddie Wayne King, both of Marietta, Ga.

[73] Assignee: The Coca-Cola Company, Atlanta, Ga.

[21] Appl. No.: 727,931

[22] Filed: Oct. 9, 1996

[51] Int. Cl.[6] ..................... B65G 59/00

[52] U.S. Cl. ..................... 221/131; 221/192

[58] Field of Search ..................... 221/67, 82, 84, 221/85, 89, 92, 131, 123, 191, 194, 192

[56] References Cited

U.S. PATENT DOCUMENTS

| | | | |
|---|---|---|---|
| 2,093,410 | 9/1937 | Boon | 312/36 |
| 2,440,251 | 4/1948 | Devens | 221/111 |
| 2,615,773 | 10/1952 | Holt et al. | 221/67 |
| 2,770,393 | 11/1956 | Gale | 221/67 |
| 2,965,262 | 12/1960 | Du Bois | 221/115 |
| 3,627,172 | 12/1971 | Gore et al. | 221/115 |
| 3,722,744 | 3/1973 | Payne | 221/129 |
| 3,810,560 | 5/1974 | Stegeman | 221/116 |
| 4,303,179 | 12/1981 | Spring | 221/7 |
| 4,483,459 | 11/1984 | Taylor et al. | 221/192 |
| 4,511,059 | 4/1985 | Manzer | 221/115 |
| 4,986,441 | 1/1991 | Kanbe et al. | 221/130 |
| 4,991,739 | 2/1991 | Levasseur | 221/14 |

FOREIGN PATENT DOCUMENTS

| | | |
|---|---|---|
| 0071438 | 9/1983 | European Pat. Off. . |
| 333430A2 | 9/1989 | European Pat. Off. . |
| 724240A2 | 7/1996 | European Pat. Off. . |
| 4444791A1 | 6/1996 | Germany . |
| 1-253090 | 10/1989 | Japan . |
| 2-93786 | 4/1990 | Japan . |
| 2-93789 | 4/1990 | Japan . |
| 3-9495 | 1/1991 | Japan . |
| 3-90992 | 4/1991 | Japan . |
| 3-226898 | 10/1991 | Japan . |
| 4-33090 | 2/1992 | Japan . |
| 4188295 | 7/1992 | Japan . |
| 5-151443 | 6/1993 | Japan . |
| 642613 | 10/1948 | Netherlands . |
| 438916 | 11/1935 | United Kingdom . |

*Primary Examiner*—Kenneth Noland
*Attorney, Agent, or Firm*—Birch, Stewart, Kolasch & Birch, LLP

[57] ABSTRACT

A vending machine is provided with a cabinet having a plurality of slanted shelves. These shelves will feed to an elevator which can be located in the center of the vending machine, to one side of the vending machine or at the rear of the vending machine. Packaged beverages will feed by gravity from the shelves to the elevator and then be delivered to the delivery port in the face of the cabinet. This delivery port will be at a convenient height for the consumer. The shelves in the cabinet are readily reconfigurable such that their positioning within the cabinet can be easily altered. Gravity release devices are provided on each shelf for discharging the packaged beverages to the elevator. These gravity release devices are powered by an activation device on the elevator. Thus, electrical connections or the like are unnecessary for the individual shelves.

38 Claims, 4 Drawing Sheets

VENDING MACHINE

BACKGROUND OF THE INVENTION

The present invention relates to a vending machine for vending packaged beverages. In particular, the present invention relates to vending machine having a cabinet with a plurality of vertically spaced shelves, elevator means for receiving packaged beverages from the shelves by gravity feed and for delivering articles to a delivery port in the front face of the cabinet.

DESCRIPTION OF THE BACKGROUND ART

Various packaged beverage vending machines are known but these machines normally rely on gravity for feeding the packaged beverage to a discharge location. Such an arrangement can be inconvenient for a consumer because he or she must bend over to pick up the vended product. Also, the full interior space within the vending machine is normally not utilized in such prior art arrangements.

Certain arrangement have been undertaken to avoid these problems. For example, U.S. Pat. No. 4,986,441 provides an elevator within a vending machine for delivery of goods to a convenient height. However, this vending machine is relatively complicated. Its manufacturing cost and maintenance requirements are therefore increased. Also, this vending machine will not readily adjust to different sized products.

Accordingly, a need in the art exists for a simple and effective vending machine for supplying packaged beverages.

SUMMARY OF THE INVENTION

Accordingly, it is a primary object of the present invention to provide a vending machine which will vend packaged beverages to a desired height.

Another object of the present invention is to provide a vending machine which will maximize and efficiently utilize the space within the vending machine cabinet.

It is a further object of the present invention to provide a vending machine which will be simple to construct and easy to maintain.

Yet another object of the present invention is to provide a vending machine which can readily adjust the spacing between shelves within the machine such that different sized packaged beverages can be dispensed therefrom.

It is yet another object of the present invention to provide a vending machine which is easily loaded.

Yet another object of the present invention is to provide a vending machine which is simple to use, reliable and efficient.

A further object of the present invention is to provide a vending machine with shelves arranged in a chevron shape or with shelves inclined to one side which feed a packaged beverage to an elevator means.

Still another object of the present invention is to provide a vending machine which has an elevator means in the rear for permitting easy access and loading of the shelves within the machine.

These and other objects of the present invention are fulfilled by providing a vending machine with a cabinet for storing a supply of packaged beverages. This cabinet has a front face with a delivery port through which the packaged beverages are vended. A plurality of vertically spaced shelves within the cabinet hold the packaged beverages. These shelves are readily reconfigurable (removable, insertable and/or adjustable) such that a configuration of the shelves within the cabinet can be easily altered. All of the shelves within the cabinet slope downwardly. Elevator means for receiving individual packaged beverages from the shelves are provided. The elevator means will vertically transport the packaged beverages to the delivery port. Gravity release means will discharge the packaged beverages to the elevator means by gravity feed. In this manner, the packaged beverages will move under the influence of gravity from the stationary surfaces of the shelves to the elevator means. The surfaces of each of the shelves on which the packaged beverages rest is stationary.

These and other objects of the present invention are further fulfilled by a vending machine with a cabinet for storing a supply of packaged beverages. The cabinet has a front and a rear with the front of the cabinet having a front face with a delivery port therein through which the packaged beverages are vended. A plurality of vertically spaced shelves are provided within the cabinet for holding the packaged beverages with all of the shelves sloping downwardly away from the front face of the cabinet. Elevator means for receiving individual packaged beverages from the shelves and for vertically transporting the packaged beverages are provided. The elevator means is in the rear of the cabinet so that the full width of the rear of the shelves are exposed for easy loading of the machine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
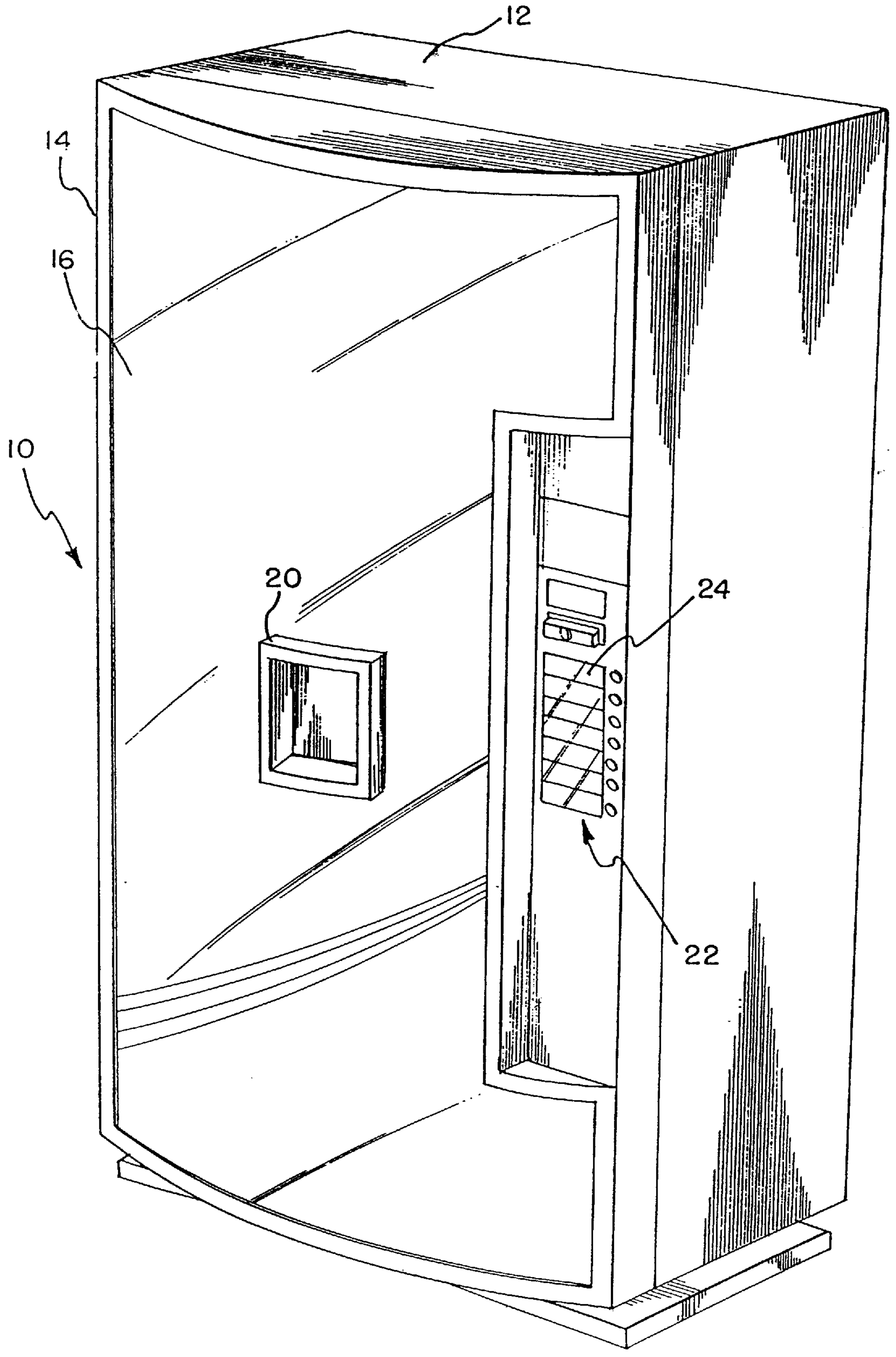
FIG. 1 is a right-front perspective view of a first embodiment of the vending machine of the present invention.

Referring in detail to the drawings and with particular reference to FIG. 1, a right-front perspective view depicting a first embodiment of a vending machine 10 of the present invention is shown. This vending machine 10 includes a cabinet 12, a door 14 and a sign panel 16 thereon. The door 14 and side panel 16 are bowed, providing a convex exterior surface for sign panel and a concave interior space. However, this arrangement could be flat or even concave if so desired.

The vending machine 10 also includes a product selection panel 22 and a plurality of product selection buttons 24. A delivery port 20 is provided in a centrally located position on the face of the cabinet 12. The height of this delivery port 20 can be selected to be any desired height. It is preferred that this delivery port 20 be at a position such that the consumer does not have to bend over to retrieve a vended packaged beverage from machine 10. This delivery port 20 could be at essentially waist-level to make the vended product more readily visible and convenient to a consumer utilizing the machine. A benefit of the present invention is that the vending machine can be made with this delivery port 20 at any desired height as will become apparent when the elevator means 34 is described below. Also, the vended packaged beverage could be delivered in an upright position.

It is contemplated that the cabinet 12 of the instant invention can be a standard triple depth cabinet in both seventy-two and seventy-nine inch versions. A shorter version may also be utilized given the vertical construction modularity, the storage capacity and the number of selections available. Of course, any suitably sized cabinet 12 could be used.

Figure 2:
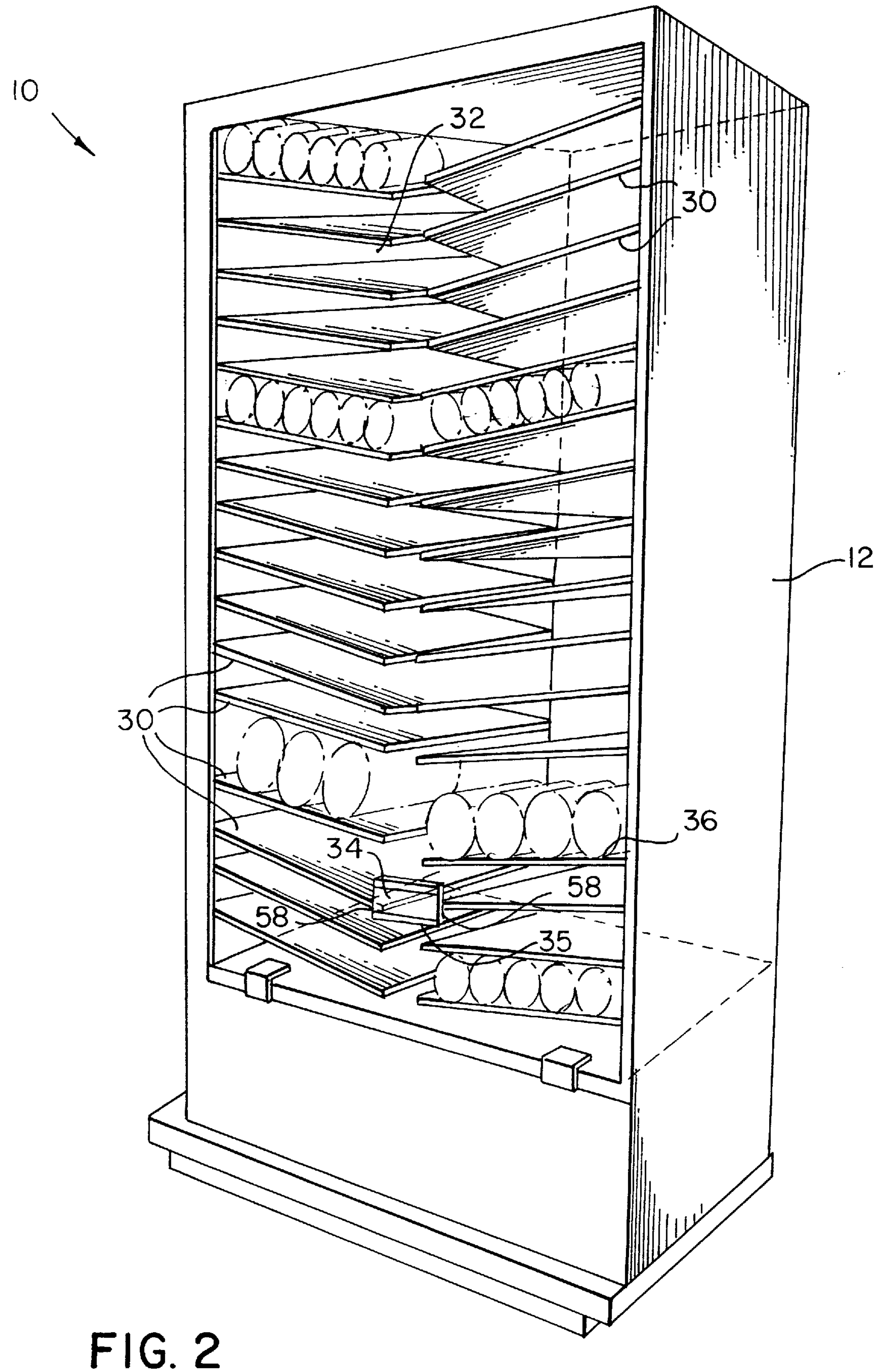
FIG. 2 is a view of the interior of the first embodiment of the vending machine of the present invention.

Turning to FIG. 2, an interior of the first embodiment of the vending machine 10 is shown. The front face of the cabinet 12 is removed. Within the cabinet, a plurality of vertically spaced shelves 30 are provided. In the first embodiment of the vending machine 10, all shelves slope downwardly in a chevron shape. The shelves on the right and left sides of the cabinet 12 are spaced from one another by an elevator path 32. Elevator means 34 are vertically movable in this elevator path 32. The elevator means 34 can include a package supporting assembly 35 which can be an elevator bucket or a shelf or any other suitable means which will move vertically along path 32. A rack and pinion drive, a chain drive, hydraulic drive or any other suitable drive means can be provided for raising and lowering the package supporting assembly 35. A gate can be provided at the front of the package supporting assembly 35 which will pivot or otherwise move to an out-of-the-way position when packaged beverages are removed from the package supporting assembly 35. Alternatively, the front of the package supporting unit 35 can be unobstructed. The package supporting assembly 35 is movable to a position flush with the edges of the shelves 30.

The shelves 30 have stationary surfaces upon which a plurality of packaged beverages rest. It is contemplated that each shelf will generally have the same predetermined depth. This depth is measured from the front to the back of cabinet 12 and permits a series of columns of packaged beverages to be placed on each shelf 12. These packaged beverages can be cans with three columns of cans, for example, being provided on each shelf. Within each column a plurality of rows of packaged beverages can be provided. If six cans, for example, are provided in a row and three columns of cans are provided for a shelf, then a single shelf can hold 18 cans.

Other than cans, the shelves of the instant invention can hold beverage bottles, one liter, one and a half liter, two liter or any other sized beverage container. In fact, any suitable product can be vended from the vending machine of the present invention.

The shelves 30 can be constructed of galvanized sheet metal, plastic or any other suitable material. As one example of a contemplated shelf arrangement, approximately seventeen slant shelves could be placed on each side of the elevator path 32 in a seventy-nine inch tall vendor. This provides a total of thirty-four storage increments. The storage of the packaged beverages will be discussed in more detail with regard to FIG. 3.

The shelves 30 can easily be removed from and/or adjusted within cabinet 12. For example, a shelf 30 can be hinged at the rear and simply lifted out of position. It will be noted that some of the shelves are more closely spaced than other shelves in FIG. 2. This is because an intervening shelf has been removed such that a larger size packaged beverage (such as a liter container) can be positioned in the vending machine 10, for example on shelf 36. The construction of shelf 36 is the same as the other shelves 30, and this shelf can also be easily inserted into and removed from the machine.

Other than having a hinged arrangement at the rear of the cabinet 12, other possible mounting arrangements are contemplated for the shelves. For example, they can be attached to the side as well as the rear of the cabinet or just to the sides of the cabinet if this is more convenient. It is merely important that the shelves are readily removable, insertable or adjustable such that the vending machine 10 can be easily reconfigured to permit quick and easy alteration to the configuration of the interior of the cabinet 12. If, for example, the vending machine 10 were to only dispense larger size containers, then every other shelf could be removed and adjusted as needed to optimize the number of shelves and brands offered, as well as the overall capacity of the machine. On the other hand, if the vending machine were to be used in Japan, for example, the vended packaged beverages would be smaller than those used in the United States. Therefore, it is contemplated that shelving space could be much tighter in such a vending machine allowing more shelves within the machine. Such adjustments of the shelving space can easily be made for the present vending machine 10.

The elevator means 34 is suitable for receiving any type of packaged beverage held in the instant vending machine 10. For example, cans, bottles, one liter, one and a half liter or two liter packages can easily be received and transported by the elevator means 34. The elevator means 34 will lift or lower the received packaged beverage from the shelves 30 to a position adjacent the delivery port 20 in the door 14 of cabinet 12. Therefore, a consumer will not have to bend over to pick up the vended product. Also, a majority of the interior of cabinet 12 is utilized.

Figure 3:
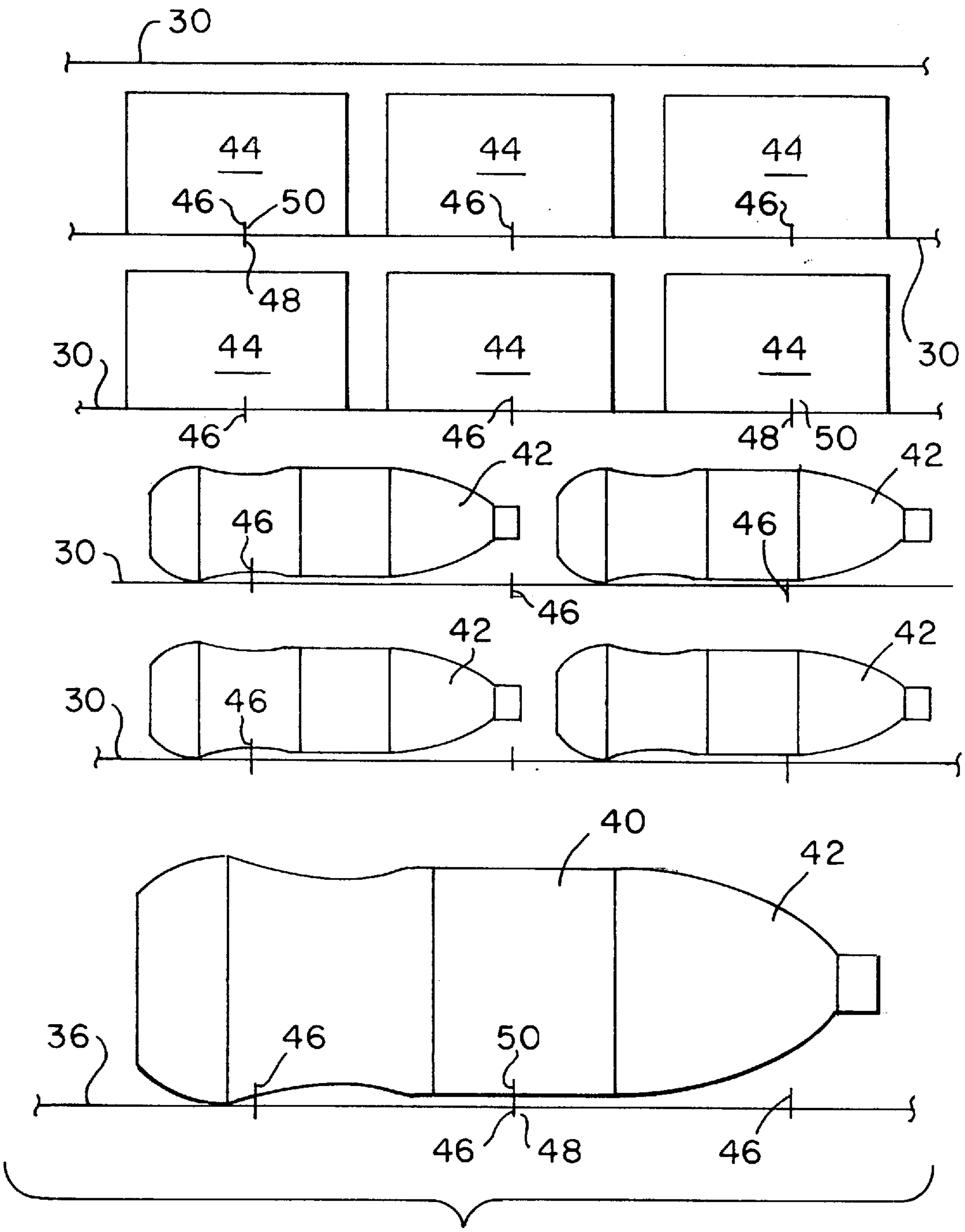
FIG. 3 is a schematic view to describe an arrangement of packaged beverages within shelves of the vending machine of the present invention.

Turning to FIG. 3, a diagrammatic view to explain how packaged beverages are held on shelves 30 is provided. On a lowermost shelf 36, a two liter packaged beverage 40 is provided. The space between this shelf 36 and the next shelf 30 is double that space shown between the other remaining sets of shelves 30. This is because an intervening shelf has been removed in order to accommodate the larger size packaged beverage 40, such as a two liter bottle. The upper shelves 30 contain bottles 42 and cans 44. It can be seen that three cans 44 or two bottles 42 can be accommodated in the space of a larger sized container 40 in the arrangement of FIG. 3. This showing is not entirely accurate for the size relationships between packaged beverages but is merely provided in order to explain the configuration of packaged beverages on the shelves and to explain their discharge from the shelves. The view of FIG. 3 is basically taken from the elevator path 32 looking towards the shelves 30.

While this discussion of FIG. 3 has focused on the shelves 30 being removed, the shelves can also simply be adjusted within the vending machine 10. They can be spaced more closely together or further apart to accommodate various sized packaged beverages. Shelves 30 can be added to the vending machine 10 or they can be removed therefrom or they can simply be shifted within the vending machine 10. The present invention can optimize brand/inventory by minimizing wasted space between shelves.

Each shelf 30 in FIG. 3 can be considered to have three regions which form columns of packaged beverages. Of course, if shorter packages were used, four columns could fit on this shelf. Alternately, the depth of vending machine 10 could be increased, for example, such that the shelves 30 were longer and therefore held more columns. Many different configurations for columns of packages beverages could be obtained with the instant invention.

Nonetheless, for an example, FIG. 3 is shown with three columns of packaged beverages on shelves 30. When cans 44 are on the shelf 30, all columns can be individually filled. However, when bottles and especially large sized bottles 40 are held on a shelf 30 or 36, then two or more columns can be bridged by this single product. In FIG. 3, the lower shelf 36 has all three columns bridged by the large sized container 40. The next two shelves 30 above shelf 36 have two bottles thereon. These two bottles 42 take up approximately the same amount of space as the large sized container 40. The bottles 42 can each be considered to bridge two regions and therefore be in two columns. The remaining loaded shelves 30 each have three cans 44. Therefore, there is a packaged beverage in each individual region (column) with no packaged beverages bridging these regions for these shelves with cans 44.

Each of the shelves 30 slopes downwardly toward the elevator path 32. At the front of each column on each shelf is gravity release means 46. This gravity release means 46 can include a portion 48 which extends below the shelf 30 and a portion 50 which extends above the shelf. The portion 48 is engageable by activation means 58 located on the elevator means 34. The activation means 58 can include a solenoid arrangement for activating the gravity release means 46.

In the first embodiment of the vending machine 10, three solenoids can be provided on each side of the elevator means 34. When it is desired for a particular beverage to be vended, the elevator means will move to a particular shelf 30 on which the beverage is located. If the beverage is in a single region (column), then a single solenoid will be actuated. This solenoid will engage the lower portion 48 of the gravity release means 46 in order to cause upper portion 50 to release the packaged beverage. The packaged beverage will then roll into the package supporting assembly 35 of the elevator means 34. The solenoid will quickly release the portion 48 in order to cause subsequent packaged beverages in the row from being discharged. In this manner, a single packaged beverage will be vended. If a packaged beverage bridges more than one column, then a plurality of solenoids sufficient to release the packaged beverage will be actuated.

Of course, rather than using a single stop 50, a plurality of stops can be used for a single column. A corresponding number of solenoids for each stop would be provided on the elevator means 34. This arrangement is preferred because it allows different sized beverages to easily and assuredly be held on the shelves. Alternatively, a pivoting ratchet arrangement could be used such that the second packaged beverage in a row would be affirmatively stopped from moving when the first packaged beverage was being discharged. Then when the solenoid released the lower portion 48, the ratchet would pivot to its initial position in order to allow the next packaged beverage to move to the forward position on the shelf for subsequent discharge. Of course, if more than three columns are used per shelf, then an appropriate number of solenoids can be used on the elevator means 34.

It is anticipated that the solenoids will be attached to the elevator means 34 and that as the package supporting assembly 35 approaches the storage shelf 30, the solenoid will be energized and will engage lower portion 48. Power to activate the gravity release means 46 is therefore provided by the elevator means 34. Thus, a power supply does not have to be provided for each individual shelf. Therefore, it is easy to remove, add or adjust the positioning of shelves from the vending machine because no connections for power supply are necessary.

Instead of using a solenoid arrangement, a single solenoid can be provided on each side of the elevator means 34 as the activation means 58. This single solenoid will engage a ratchet mechanism that sequences the gravity release means 46 much in the same way that a triple depth vendor operates. For bottles, both the initial and middle gates would be released together.

Alternatively, the elevator chain can reverse and engage the gravity release means 46 to thereby act as the activation means 58.

As another alternative, an active vending mechanism could be used. This option utilizes powered vend mechanisms on the shelf. When the consumer makes a selection, the elevator means 53 moves to the appropriate shelf 30, the vending mechanism is activated, and the packaged beverage rolls into the package supporting assembly 35 of the elevator means 34. In this option, the elevator means 34 does not play a part in activating the vending mechanism. The elevator means 34 only receives and delivers the packaged beverage.

An additional option is using static shelves. This option incorporates a gravity release means on the elevator means 34, however, there are no moving parts on shelves 30. The gravity release means would have a mechanism to transfer the package from the shelf to the elevator. The shelf 30 would have a stop to prevent packages from rolling into the elevator path 32, but the gravity release means would have to lift the packages above this stop to transfer the package into the package supporting assembly 35 of the elevator means 34.

The elevator means 34 travels over the full height of the storage area. It should be appreciated that if three regions (columns) of beverages are provided, then the packaged beverages stored towards the rear of the machine must be moved forwardly in order to be dispensed through the delivery port 20. This is carried out by the package supporting assembly 35 of the elevator means 34 being inclined. This inclination will result in packaged beverages being transported from the rear of supporting assembly 35 to the front thereof. The packaged beverages will then be discharged from the front of the supporting assembly 35 to the delivery port 20 by gravity when the supporting assembly 35 reaches the height of the port 20. Therefore, this discharging arrangement of the instant invention is relatively uncomplicated. As another device for moving packaged beverages to the front of the package supporting assembly, a conveyor or push bar could be used. These methods offer positive product delivery and space utilization advantages.

Figure 4:
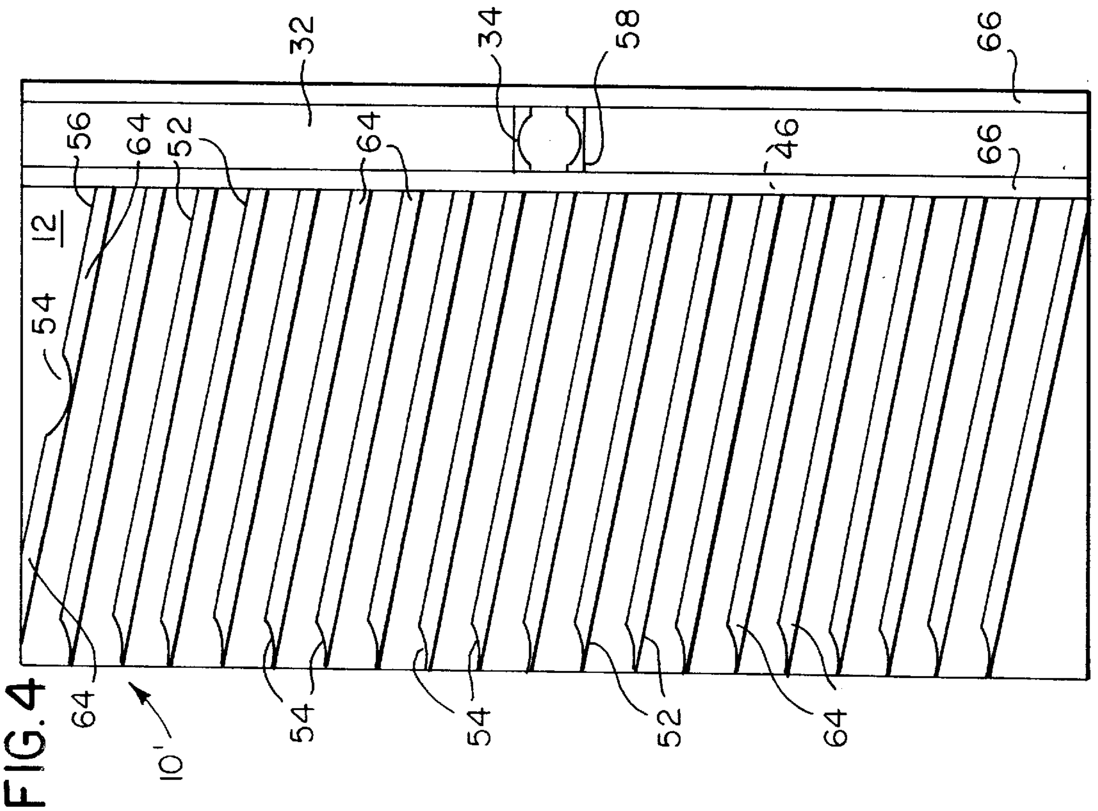
FIG. 4 is a sectional view from the front showing a second embodiment of the vending machine of the present invention.

Turning now to FIG. 4, a second embodiment of the vending machine 10' will now be described. This view is from the front and shows the interior of cabinet 12. In this arrangement, all shelves 52 slant towards one side. Because the shelves are not arranged in the chevron, these shelves of the second embodiment are identified by the different reference numeral 52. However, this second embodiment does have an elevator path 32 and elevator means 34 at the downstream side of the shelves 52. Packaged beverages will be discharged from the downstream side of the shelves to the elevator means 34. The packaged beverages will then again move by gravity to the front of the elevator means 34 where they will be discharged from a delivery port located to one side of the cabinet 12.

In the arrangement shown in FIG. 4, the elevator path 32 is located on the right-hand side of the cabinet 12. Therefore, the delivery port 20 will be located on the right-hand side of the cabinet. It should be contemplated, however, that this arrangement could be reversed. All shelves could instead slant downwardly to the left with the elevator path 32 and elevator means 34 being located on the left-hand side of the cabinet 12. In such a situation, the delivery port would of course then be located on the left-hand side of the cabinet as well.

An inlet 54 is provided for each of the shelves. This inlet provides for easy charging of packaged beverages to the shelves. It should be noted that the upper shelf has its inlet 54 spaced from the upper end thereof. This is because packaged beverages cannot fit on the uppermost portion of this shelf due to limited spacing at the top of the cabinet. In the embodiment shown in FIG. 4, all shelves 52 are mounted within cabinet 12. Of course, any of these shelves can be removed, if for example, larger size packaged beverages were to be dispensed from this arrangement. Similarly to the first disclosed embodiment, the shelves 52 of the second embodiment are readily removable. Alternately, additional shelves 52 could be added or the spacing between shelves could be adjusted. For example, nonuniform shelve spacing could be used when different sized packaged beverages were to be held by machine 10'. The shelves 52 are also contemplated as being made from galvanized sheet metal, plastic or any other suitable material. These shelves 52 provide stationary surfaces on which the packaged beverages rest.

In FIG. 4, the shelves 52 are shown with a lower lip 64 extending along the front face thereof. The upper shelf has lip 64 broken by the outlet 54. In a preferred embodiment of the invention, the lips 64 on all of the shelves 54 are omitted. Therefore packaged beverages can more easily be loaded onto each of the shelves 54 and different sized products can more easily be accommodated.

At the lower edges of each of the shelves, gravity release means 46 are provided for discharging individual packaged beverages to the elevator means 34. The left-side frame member 66 obstructs the view of the gravity release means 46 in FIG. 4. The elevator means 34 has appropriate activation means 58 such as the solenoid for causing the gravity release means 46 to discharge a selected packaged beverage.

The vending machine of the second embodiment of the vending machine 10' can hold at least 11 cans on 19 of its shelves in a total of three regions (columns). In addition, 15 cans can be held in the uppermost row 56. Therefore, a total of 642 cans can be held in the second embodiment of the vending machine 10'. Likewise, ten bottles in two regions (columns) can be held on the 19 shelves plus 12 additional bottles on the uppermost shelf 56. Therefore, a total of 392 bottles can be held in the vending machine of the second embodiment 10'.

The vending machine 10' of the second embodiment has an advantage over the chevron arrangement in that the central elevator path 32 is moved to the side of the machine. Therefore, only one set of shelves is necessary. This reduces the number of gravity release means 46 needed and reduces the number of individual activation means on the elevator means 34.

Figure 5:
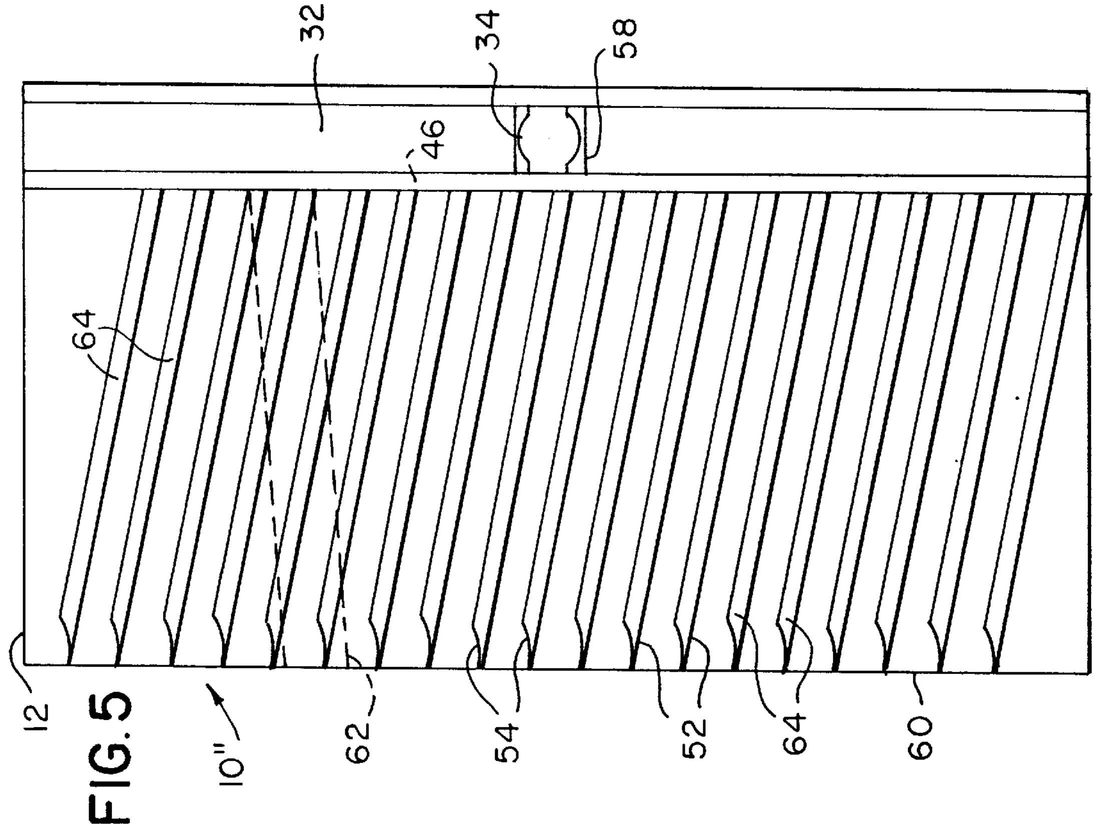
FIG. 5 is a sectional section view from the side showing a third embodiment of the vending machine of the present invention.

Turning to FIG. 5, a third embodiment of the vending machine 10" is shown. Similarly to FIG. 4, shelves 52 slant downwardly towards the elevator path 32. However, in the arrangement of FIG. 5, the front of the vending machine is indicated by reference numeral 60. Therefore, FIG. 5 is a side view whereas FIG. 4 is a front view.

The elevator means 34 is provided at the rear of the cabinet 12 in the third embodiment. When the door is opened on the front 60 of the vending machine 10", the entire span of the shelves 52 are exposed. Therefore, this embodiment can be easily loaded.

Similarly to the first and second embodiments, it is contemplated that the shelves 52 in the third embodiment will be constructed from galvanized sheet metal, plastic or other suitable material. The packaged beverages will rest on the shelves 52 which form stationary surfaces. The lips 64 on the sides of the shelves 52 can be omitted or can be used to accommodate means for mounting the shelves 52 to the cabinet 12. Gravity release means 46 are provided at the bottom edges of each region providing a plurality of the columns on each shelf and the elevator means 34 has appropriate activation means 58 for activating each of the gravity release means 46.

An uppermost shelf 56 is not provided in the embodiment of FIG. 5. Therefore, it is contemplated that this arrangement will hold 11 cans in regions forming three columns on a total of 19 shelves for a total of 627 cans or will hold ten bottles in two regions on a total of 19 shelves such that 380 bottles will be held. The extra capacity provided by the upper shelf 56 is not obtained with the third embodiment of the vending machine 10" shown in FIG. 5. Of course, this shelf 56 could be reinserted if so desired in order to increase capacity of the third embodiment of the vending machine 10". However, it is necessary to provide an opening for loading of this shelf with packaged beverages from the front of the machine 60.

Similarly to the previously disclosed embodiments, the shelves 52 of the third embodiment of the vending machine 10" are readily reconfigurable. Thus, the shelves 52 can be easily rearranged in order to accommodate different size containers.

In the third embodiment of the vending machine 10", packaged beverages are fed to the elevator means 34 at the rear of the cabinet 12. The packaged beverages move by gravity from the shelves 52 to the package supporting assembly 35 of the elevator means 34. The packaged beverages then move through delivery chute 62 to be discharged at a convenient consumer height from the delivery port 20 in the front face of the cabinet 12. While it is contemplate that the packaged beverages will move by gravity through this delivery chute 62, any power assisted transport arrangement could be used if so desired. For example, a conveyor or push bar could be used to positively displace the packaged beverage. While the lower end of delivery chute 62 is shown at an “eye-level” position toward the top of cabinet 12, this end could be further lowered or the entire chute 62 could be lowered such that the outlet was at waist-level or at any other desired height.

Accordingly, the present invention provides an arrangement for vending packaged beverages to a convenient height. This vending machine is rather uncomplicated and therefore easy to maintain. The shelves in the vending machine can be easily removed, inserted and reconfigured such that different size products can readily be dispensed therefrom. The present invention can therefore optimize brand inventory within a vending machine by minimizing wasted space between the shelves.

It should be appreciated that various modifications can be made to the described vending machines 10, 10' and 10". For example, in the first and second vending machines 10, 10', packaged beverages were moved from a rear position in the cabinet on the package supporting assembly 35 of the elevator means 34 by gravity. Instead, some mechanism could be provided to actively push or pull these packaged beverages to the front of the package supporting assembly 35. Also, the vending machines 10, 10' and 10" can dispense packaged beverages or any other suitable product.

Other modifications will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A vending machine comprising:

a cabinet for storing a supply of packaged beverages, said cabinet having a front face with a delivery port therein through which the packaged beverages are vended;

a plurality of vertically spaced shelves within the cabinet for holding the packaged beverages, the shelves being readily removable such that a configuration of the shelves within the cabinet can be altered, all of the shelves within the cabinet sloping downwardly, the surfaces of each of the shelves on which the packaged beverages rest being stationary, the shelves each being divisible into a plurality of regions for supporting packaged beverages in spaced columns such that each shelf can hold a plurality of rows and columns of packaged beverages;

elevator means for receiving individual packaged beverages from the shelves and for vertically transporting the packaged beverages to the delivery port; and gravity release means for discharging the packaged beverages to the elevator means such that the packaged beverages move only under influence of gravity from the stationary surfaces of the shelves to the elevator means.

2. The vending machine according to claim 1, wherein the elevator means includes a packaged beverage supporting assembly movable along an elevator path centrally located within the cabinet, the delivery port being centrally located on the front face of the cabinet relative to sides of the cabinet, and the shelves being in a chevron and sloping downwardly toward the elevator path.

3. The vending machine according to claim 2, further comprising activation means for actuating the gravity release means, the gravity release means being located on each shelf and the activation means being located on the packaged beverage supporting assembly, the supporting assembly being vertically movable along the elevator path and a selected gravity release means being actuated when the supporting assembly is at a same height as the selected gravity release means.

4. The vending machine according to claim 3, wherein gravity release means are provided for each region for a column of beverages on each of the shelves.

5. The vending machine according to claim 4, wherein certain packaged beverages bridge regions for columns in order to be in more that one region when on a shelf, the activation means actuating all of the gravity release means for the regions in which the certain packaged beverages are located when a certain packaged beverage is to be discharged.

6. The vending machine according to claim 3, wherein three regions for three potential columns of packaged beverages are provided for each shelf and wherein three gravity release means are provided for each shelf.

7. The vending machine according to claim 3, wherein the activation means comprises a solenoid for each gravity release means, the solenoids being on each side of the packaged beverage supporting assembly.

8. The vending machine according to claim 1, wherein the elevator means includes a packaged beverage supporting assembly movable along an elevator path located on one side of the cabinet, the delivery port being located on a side of the front face of the cabinet, and all of the shelves sloping downwardly toward the elevator path.

9. The vending machine according to claim 8, further comprising activation means for actuating the gravity release means, the gravity release means being located on each shelf and the activation means being located on the packaged beverage supporting assembly, the packaged beverage supporting assembly being vertically movable along the elevator path and a selected gravity release means being actuated when the supporting assembly is at a same height as the selected gravity release means.

10. The vending machine according to claim 9, wherein gravity release means are provided for each region for a column of beverages on each of the shelves.

11. The vending machine according to claim 10, wherein certain packaged beverages bridge regions for columns to be in more that one region when on a shelf, the activation means actuating all of the gravity release means for the regions in which the certain packaged beverages are located when a certain packaged beverage is to be discharged.

12. The vending machine according to claim 9, wherein three regions for three potential columns of packaged beverages are provided for each shelf and wherein three gravity release means are provided for each shelf.

13. The vending machine according to claim 9, wherein the activation means comprises a solenoid for each gravity release means, the solenoids being on only one side of the packaged beverage supporting assembly.

14. The vending machine according to claim 1, wherein the cabinet has a front and a rear and wherein the elevator means includes a packaged beverage supporting assembly movable along an elevator path located at the rear of the cabinet, the delivery port being located on the front of the cabinet, and all of the shelves sloping rearwardly and downwardly toward the elevator path.

15. The vending machine according to claim 14, further comprising means for moving packaged beverages from the packaged beverage supporting assembly to the delivery port.

16. The vending machine according to claim 14, further comprising activation means for actuating the gravity release means, the gravity release means being located on each shelf and the activation means being located on the packaged beverage supporting assembly, the supporting assembly being vertically movable along the elevator path and a selected gravity release means being actuated when the supporting assembly is at a same height as the selected gravity release means.

17. The vending machine according to claim 16 wherein gravity release means are provided for each region for a column of beverages on each of the shelves.

18. The vending machine according to claim 17, wherein certain packaged beverages bridge regions to be in more that one regions when on a shelf, the activation means actuating all of the gravity release means for the regions in which the certain packaged beverages are located when a certain packaged beverage is to be discharged.

19. The vending machine according to claim 16, wherein the activation means comprises a solenoid for each gravity release means, the solenoids being on each side of the packaged beverage supporting assembly.

20. A vending machine comprising:

a cabinet for storing a supply of packaged beverages, said cabinet having a front and a rear with the front of the cabinet having a front face with a delivery port therein through which the packaged beverages are vended;

a plurality of vertically spaced shelves within the cabinet for holding the packaged beverages, all of the shelves within the cabinet sloping downwardly away from the front face of the cabinet;

elevator means for receiving individual packaged beverages from the shelves and for vertically transporting the packaged beverages, the elevator means being in the rear of the cabinet.

21. The vending machine according to claim 20, further comprising gravity release means for discharging the packaged beverages to the elevator means such that the packaged beverages move under influence of gravity from the shelves to the elevator means.

22. The vending machine according to claim 20, wherein the surfaces of each of the shelves on which the packaged beverages rest is stationary.

23. The vending machine according to claim 20, wherein the elevator means includes a packaged beverage supporting assembly movable along an elevator path located at the rear of the cabinet, the delivery port being located on the front of the cabinet, and all of the shelves sloping rearwardly and downwardly toward the elevator path.

24. The vending machine according to claim 23, further comprising means for moving packaged beverages from the packaged beverage supporting assembly to the delivery port.

25. The vending machine according to claim 23, further comprising:

gravity release means for discharging the packaged beverages to the elevator means such that the packaged beverages move under influence of gravity from the shelves to the elevator means; and activation means for actuating the gravity release means, the gravity release means being located on each shelf and the activation means being located on the packaged beverage supporting assembly, the supporting assembly being vertically movable along the elevator path and a selected gravity release means being actuated when the supporting assembly is at a same height as the selected gravity release means.

26. The vending machine according to claim 25, wherein each shelf has a predetermined depth divisible into a plurality of regions for supporting packaged beverages in spaced columns thereon, gravity release means being provided for each region for a column of beverages on each of the shelves.

27. The vending machine according to claim 26, wherein certain packaged beverages bridge regions to be in more that one regions when on a shelf, the activation means actuating all of the gravity release means for the regions in which the certain packaged beverages are located when a certain packaged beverage is to be discharged.

28. The vending machine according to claim 25, wherein the activation means comprises a solenoid for each gravity release means, the solenoids being on each side of the packaged beverage supporting assembly.

29. A vending machine comprising:

a cabinet for storing a supply of packaged beverages, said cabinet having a front face with a delivery port therein through which the packaged beverages are vended;

a plurality of vertically spaced shelves within the cabinet for holding the packaged beverages, all of the shelves within the cabinet sloping downwardly in a chevron, the surfaces of each of the shelves on which the packaged beverages rest being stationary;

an elevator, packaged beverages being deliverable from the shelves to the elevator and the elevator then vertically transports the packaged beverages to the delivery port; and a gravity release device, the packaged beverages being discharged to the elevator by the gravity release device such that the packaged beverages move under influence of gravity from the stationary surfaces of the shelves to the elevator.

30. The vending machine according to claim 29, wherein the elevator includes a packaged beverage supporting assembly which receives individual packaged beverages whereafter the elevator sequentially transport individual packaged beverages.

31. The vending machine according to claim 29, wherein the delivery port is located above at least one pair of the shelves in the cabinet and wherein the elevator lifts packaged beverages from shelves beneath the delivery port to the delivery port.

32. The vending machine according to claim 29, wherein the shelves are readily reconfigurable such that a configuration of the shelves within the cabinet can readily be altered.

33. The vending machine according to claim 29, wherein the elevator includes a packaged beverage supporting assembly movable along an elevator path centrally located within the cabinet, the delivery port being centrally located on the front face of the cabinet relative to sides of the cabinet, and the shelves sloping downwardly toward the elevator path.

34. The vending machine according to claim 33, further comprising activation means for actuating the gravity release device, the gravity release device being located on each shelf and the activation means being located on the packaged beverage supporting assembly, the supporting assembly being vertically movable along the elevator path and a selected gravity release device being actuated when the supporting assembly is at a same height as the selected gravity release device.

35. The vending machine according to claim 34, wherein each shelf has a predetermined depth divisible into a plurality of regions for supporting packaged beverages in spaced columns thereon, a gravity release device being provided for each region for a column of beverages on each of the shelves.

36. The vending machine according to claim 35, wherein certain packaged beverages bridge regions for columns in order to be in more that one region when on a shelf, the activation means actuating all of the gravity release devices for the regions in which the certain packaged beverages are located when a certain packaged beverage is to be discharged.

37. The vending machine according to claim 34, wherein three regions for three potential columns of packaged beverages are provided for each shelf and wherein three gravity release devices are provided for each shelf.

38. The vending machine according to claim 34, wherein the activation means comprises a solenoid for each gravity release devices, the solenoids being on each side of the packaged beverage supporting assembly.

* * * * *